United States Patent
Hahn

(10) Patent No.: US 9,592,649 B2
(45) Date of Patent: Mar. 14, 2017

(54) AMINO RESIN FILM AND METHOD OF PRODUCING THE SAME

(71) Applicant: Resopal GmbH, Gross-Umstadt (DE)

(72) Inventor: Hans Ludwig Hahn, Biblis (DE)

(73) Assignee: Resopal GmbH, Gross-Umstadt (DE)

( * ) Notice: Subject to any disclaimer, the term of this patent is extended or adjusted under 35 U.S.C. 154(b) by 330 days.

(21) Appl. No.: 14/134,049

(22) Filed: Dec. 19, 2013

(65) Prior Publication Data

US 2014/0179186 A1 Jun. 26, 2014

(30) Foreign Application Priority Data

Dec. 20, 2012 (EP) .................... 12008474

(51) Int. Cl.
| | | |
|---|---|---|
| *B32B 5/02* | (2006.01) | |
| *D04H 1/65* | (2012.01) | |
| *D06M 15/423* | (2006.01) | |
| *C08J 5/24* | (2006.01) | |
| *B32B 5/26* | (2006.01) | |

(52) U.S. Cl.
CPC ............ *B32B 5/022* (2013.01); *B32B 5/26* (2013.01); *C08J 5/24* (2013.01); *D04H 1/65* (2013.01); *D06M 15/423* (2013.01); *B32B 2260/023* (2013.01); *B32B 2260/046* (2013.01); *B32B 2262/0261* (2013.01); *B32B 2262/0276* (2013.01); *B32B 2307/412* (2013.01); *B32B 2307/54* (2013.01); *B32B 2307/542* (2013.01); *B32B 2307/584* (2013.01); *B32B 2307/7265* (2013.01); *B32B 2451/00* (2013.01); *B32B 2605/00* (2013.01); *B32B 2605/003* (2013.01); *C08J 2361/28* (2013.01); *Y10T 442/2008* (2015.04); *Y10T 442/2893* (2015.04); *Y10T 442/697* (2015.04)

(58) Field of Classification Search
CPC ........ B32B 5/022; B32B 5/02; D06M 15/423; D04H 1/65; C08J 7/047; Y10T 442/2893; Y10T 442/697
USPC ........... 442/168, 415, 60; 428/219; 425/363; 264/137

See application file for complete search history.

(56) References Cited

U.S. PATENT DOCUMENTS

| | | |
|---|---|---|
| 3,816,212 A | 6/1974 | O'Brien |
| 2004/0192139 A1 | 9/2004 | Pallach et al. |
| 2005/0221705 A1 | 10/2005 | Hitch |

FOREIGN PATENT DOCUMENTS

| | | |
|---|---|---|
| DE | 1947142 A1 | 6/1970 |
| DE | 10 312 817 A1 | 10/2004 |
| DE | 103 12 819 A1 | 10/2004 |
| DE | 10 2005 035 690 A1 | 2/2007 |
| DE | 10 2005 035 691 A1 | 2/2007 |
| EP | 0 826 790 A1 | 3/1998 |
| FR | 2 735 152 A1 | 12/1996 |
| GB | 1214873 A | 12/1970 |
| WO | WO-00/71343 A1 | 11/2000 |
| WO | WO-2007/012617 A1 | 2/2007 |

OTHER PUBLICATIONS

Search Report in EP Application No. 13005807.6 dated May 19, 2014.
A. Gardziella, H.G. Haub, "*Phenolharze*" ("Phenolic Resins") in: Kunststoff Handbuch (Plastics Handbook), vol. 10, "*Duroplaste*" ("Thermosets"), pp. 12-40, Carl Hanser Publishers, München, Wien, 1988.
Becker and Braun, Kunststoffhandbuch 10 Duroplaste, (Plastics Handbook 10 Thermosets), Carl Hansa Publishers, München Wien, 1988, 2nd edition, pp. 41 to 51.
Ullmann's Encyclopedia of Industrial Chemistry, Wiley VCH Publishers, Weinheim, 2003, 6th edition, vol. 2, pp. 537 to 565.

*Primary Examiner* — Arti Singh-Pandey

(74) *Attorney, Agent, or Firm* — Marshall, Gerstein & Borun LLP

(57) ABSTRACT

An amino resin film, obtained by at least partial curing of an aminoplastic-nonwoven impregnate having a residual moisture of at least 4.0% by weight, comprising, in each case in relation to the total weight of the aminoplastic-nonwoven impregnate,
  (a) 5.0% by weight to 95.0% by weight of a partially cured aminoplastic resin and
  (b) 5.0% by weight to 95.0% by weight of a nonwoven, wherein the nonwoven comprises polyester fibers and polyamide fibers, and wherein the amino resin film has a residual moisture of less than 4.0% by weight.

14 Claims, No Drawings

AMINO RESIN FILM AND METHOD OF PRODUCING THE SAME

BACKGROUND OF THE INVENTION

Field of the Invention

The present invention relates to an amino resin film, a method for production thereof, and use thereof.

Related Technology

Amino resin films or sheetings for the coating of substrates have long been known and are usually produced from commercially available absorbent cellulosic fibrous materials, woven fabrics, or decorative papers by impregnating these materials with an amino resin in a one-step or two-step method. For further details, reference is made to the specialist literature, in particular to Ullmann's Encyclopedia of Industrial Chemistry, Wiley VCH Publishers, Weinheim, 2003, 6$^{th}$ edition, volume 2, page 537 to 565.

These amino resin films or sheetings are suitable in particular for finishing smooth surfaces, for example in the furniture industry. Here, furniture manufacturers have increasingly expressed the desire in recent years to also use amino resin films for the 3D coating of areas with three-dimensional structures, for example as can be found with some styles (furniture in a country cottage style). The above-described melamine resin films are not suitable however for 3D coating due to their insufficient deformability.

To solve this problem, German patent application DE 10 2005 035 690 A1 proposes the use of amino resin nonwoven films or sheetings, which contain a nonwoven impregnated with a crosslinkable aminoplastic resin, wherein the nonwoven contains 1 to 100% by weight of melamine fibers in relation to the total fiber content. These films or sheetings are to be suitable for planar coating of three-dimensionally structured surfaces, shaped articles and three-dimensionally structured objects comprising sharp-edged elements, and are to still have the usual quality features of an amino resin nonwoven sheeting or film. In particular, very good surface qualities are to be achieved with good deformability.

The films or sheetings in DE 10 2005 035 690 A1 are not suitable however for the objectives of the present invention. The amino resin nonwoven films described herein, due to the use of melamine resin fibers in the nonwoven, indeed have a higher three-dimensional flexibility than amino-melamine resin films based on cellulose fibers. However, from a user's viewpoint, a further improvement of the degree of three-dimensional deformability, surface robustness, surface properties and also tensile strength are desirable.

German patent application DE 10312819 A1 describes a cover layer for engine compartment cladding, consisting of at least one binder-bonded nonwoven layer, wherein the nonwoven layer is cured from a mixture of viscose (VC) fibers, polyester (PES) fibers, cellulose fibers, polyamide (P(A) fibers, polyolefin fibers and/or preoxidized polyacrylonitrile (PAN) fibers and hot melt adhesive fibers using a binder, which demonstrates thermoplastic behavior in the temperature range from 20 to 200° C. and thermoset behavior above 200° C. Examples for a suitable binder include acrylic acid copolymers and terpolymers with styrene, butadiene and/or acrylonitrile. The use of aminoplastics as a binder is not considered, however.

Similarly, German patent application DE 10312817 A1 discloses a cover layer for engine compartment cladding, consisting of at least one binder-bonded nonwoven layer, wherein the nonwoven layer is cured with a binder, which demonstrates thermoplastic behavior in the temperature range from 20 to 200° C. and thermoset behavior above 200° C. Acrylic acid copolymers and terpolymers with styrene, butadiene, and/or acrylonitrile are mentioned as examples for suitable binder. References to the use of aminoplastics as a binder however also cannot be inferred from this document.

For the applications currently contemplated, materials having thermoset properties at much lower temperatures, in particular at temperatures less than 150° C., are desirable however.

International patent application WO 0071343 A1 teaches the production of laminates for the automotive field, which are obtained by bonding suitable substrates, for example fibers, with use of a two-pack adhesive.

However, the laminate of WO 0071343 A1 does not have the surface properties desired in the present case. Flexible materials with closed surfaces that are as transparent as possible and are comparable to a laminated surface pressed at high pressure, are not described in WO 0071343 A1.

French patent application FR 2735152 A1 relates to the production of a sheet material obtained by impregnating a paper with 35-70% by weight of melamine resin, phenol resin or urea resin, wherein the paper comprises a mixture of cellulose fibers and artificial and/or synthetic fibers.

However, the sheet material in FR 2735152 A1 has insufficient flexibility and inadequate tensile strength for the applications considered in the present case.

U.S. published patent application US 2005/221705 A1 discloses impregnated nonwovens which comprise fibers having at least two different lengths in the range from 0.12 inch to 0.06 inch. The nonwoven preferably contains glass fibers, wherein synthetic fibers made of nylon, polyester and polyethylene are also mentioned alternatively. In particular, acrylates, with or without crosslinking agent, polyvinyl alcohol, carboxymethyl cellulose, hydroxylethyl cellulose, lignin sulfonates and urea-formaldehyde resin are mentioned as preferred binders for the impregnate.

For the applications currently contemplated, in particular the tensile strength of these materials is too low, however.

SUMMARY OF THE INVENTION

On this basis, possibilities for improving conventional amino resin films should be identified. Here, the focus was placed in particular on the desire for amino resin films having maximum flexibility and good surface condition, especially with good surface quality after deformation. At the same time, the amino resin films should demonstrate the highest possible tensile strength. In addition, the amino resin films should have a hygienic surface that is closed to the greatest possible extent, the highest possible scratch resistance, the highest possible shear strength, and the highest possible resistance to water. The amino resin films should preferably be translucent and in particular should enable the presentation of particularly deep structures. In addition, the amino resin films should have the lowest possible specific density and the lowest possible fire load so that they can be used as flame retardant materials.

Here, the solution according to the invention should be practicable in the simplest manner possible, on a commercial scale and cost-effectively, and should be useable universally, in particular for the production of composite materials comprising amino resin films of this type. In this regard, a solution for improving the processability of conventional aminoplastic-nonwoven films to the greatest possible extent and in particular for enabling clean drilling, milling and clean processing with a guillotine was sought in particular.

Furthermore, possibilities for the simplest possible production of amino resin films printed with the greatest possible quality should be identified.

These and also further objects, which will become clear immediately from the contexts discussed herein, are achieved by an amino resin film obtained by at least partial curing of an aminoplastic-nonwoven impregnate having a residual moisture of at least 4.0% by weight, comprising, in each case in relation to the total weight of the aminoplastic-nonwoven impregnate,
(a) 5.0% by weight to 95.0% by weight of a partially cured amino resin, and
(b) 5.0% by weight to 95.0% by weight of a nonwoven, wherein the nonwoven comprises polyester fibers and polyamide fibers and the amino resin film has a residual moisture of less than 4.0% by weight.

The invention also encompasses advantageous aminoplastic-nonwoven impregnates for producing the amino resin film according to the invention, methods for producing the aminoplastic-nonwoven impregnate according to the invention, and also particularly advantageous fields of application for the amino resin film according to the invention.

Due to the provision of an amino resin film which is obtainable by at least partial curing of an aminoplastic-nonwoven impregnate which has a residual moisture of at least 4.0% by weight and, in each case in relation to the total weight of the aminoplastic-nonwoven impregnate, comprises
(a) 5.0% by weight to 95.0% by weight of a partially cured amino resin, and
(b) 5.0% by weight to 95.0% by weight of a nonwoven, wherein the nonwoven comprises polyester fibers and polyamide fibers, and wherein the amino resin film has a residual moisture less than 4.0% by weight, it is possible, in a manner not heretofore readily foreseeable, to provide an amino resin film having an improved property profile. The amino resin film according to the invention is characterized in particular by a particularly high flexibility and good surface character, especially by a good surface quality after deformation. Here, the amino resin film according to the invention has a greater two-dimensional and three-dimensional flexibility, in particular compared to cellulose webs that have been impregnated with melamine resin.

Due to the greater flexibility of the amino resin film, it is possible to layer a number of aminoplastic-nonwoven impregnates one above the other and to thus produce amino resin films having a higher film thickness, which can then be deformed three-dimensionally into the desired end form. Amino resin films of this type with greater film thicknesses have excellent surface robustness and surface properties, even after the three-dimensional deformation, which are comparable to the corresponding properties of laminates pressed at high pressure.

At the same time, the amino resin films according to the invention generally demonstrate a comparatively high tensile strength.

In addition, the amino resin films according to the invention have a very high scratch resistance, a very high shear strength, and a very high resistance to water. Furthermore, the amino resin films according to the invention are generally translucent and enable the presentation of particularly deep structures. The comparatively low specific density of the amino resin films according to the invention causes a lower fire load and therefore enables use as flame retardant material or laminate.

Lastly, the solution according to the invention can be carried out and implemented in a comparatively simple manner, on a commercial scale, and cost-effectively. It can be used universally and is suitable in particular for the production of composite materials comprising amino resin films of this type. Here, the aminoplastic-nonwoven impregnate according to the invention and the amino resin film according to the invention and the composite material according to the invention are characterized by improved processability, and the amino resin film according to the invention and the composite material according to the invention in particular allow clean drilling, milling, and clean processing with a lever shear.

DETAILED DESCRIPTION

The amino resin films according to the invention can generally be produced with use of a high-pressure laminate press, in which the aminoplastic-nonwoven impregnates are pressed as flat material. Here, the amino resin film thus produced can also be provided with a finely structured surface, and the resultant amino resin film can then be deformed three-dimensionally under heat and pressure as necessary, without losing its finely structured surface. In this regard, an advantage compared to the prior art is also the low temperature, normally below 150° C., at which the amino resin film can be cured.

Due to the use of accordingly printed nonwovens (before the impregnation with the aminoplastic), the production of printed amino resin films according to the invention is possible in an extremely simple manner with the same quality as with the use of decorative paper, for example by impregnating the printed nonwoven with an aminoplastic and by curing the aminoplastic.

The amino resin film of the present invention is attainable by at least partial curing of an aminoplastic-nonwoven impregnate, which, in each case in relation to the total weight of the aminoplastic-nonwoven impregnate, comprises
(a) 5.0% by weight to 95.0% by weight, preferably 10.0% by weight to 75.0% by weight, preferably 15.0% by weight to 60.0% by weight, particularly preferably 20.0% by weight to 50.0% by weight, in particular 20.0% by weight to 45.0% by weight, of a partially cured amino resin, and
(b) 5.0% by weight to 95.0% by weight, preferably 25.0% by weight to 90.0% by weight, preferably 40.0% by weight to 85.0% by weight, particularly preferably 50.0% by weight to 80.0% by weight, in particular 55.0% by weight to 80.0% by weight of a nonwoven,
wherein the proportion of further constituents is preferably less than 25.0% by weight, preferably less than 10.0% by weight, particularly preferably less than 5.0% by weight, and in particular less than 1.0% by weight.

"Aminoplastics" are polycondensation products from carbonyl compounds, preferably aldehydes, such as formaldehyde, or ketones, and compounds containing NH groups, such as urea, melamine, urethane, cyanamide or cyandiamide, aromatic amines and sulfonamides, which are linked to one another in a sort of Mannich reaction and cure during use to form thermosets. Preferred aminoplastics are urea resins, melamine resins, urethane resins, cyanamide resins or cyandiamide resins, aniline resins and sulfonamide resins. The use of melamine formaldehyde resins has proven to be particularly preferred. These are to be understood to mean curable condensation products from melamine and formaldehyde. Furthermore, melamine urea formaldehyde resins may also be preferred. In addition, the use of melamine formaldehyde acrylate resins is also particularly advantageous.

For the purposes of the present invention, melamine formaldehyde resins in particular, which are preferably obtainable by condensation of melamine with formaldehyde at a molar ratio of 1.3 mol to 2.5 mol of formaldehyde per mol of melamine, have proven to be of use. The condensation of the resins preferably occurs at a pH in the range from 8 to 10 and expediently at a temperature in the range from 40° C. to 100° C. until the suitable degree of condensation is reached. The melamine resins thus produced generally have solid contents from 40 to 70% by weight, wherein the dry residue, which is established by drying 1 g of aqueous resin for two hours in a drying cabinet at 120° C., is denoted here as solid content. The viscosity of the aqueous resins, in each case measured at 20° C., preferably lies in the range from 10 to 200 mPas in particular between 30 and 150 mPas.

The amino resin may contain conventional quantities of additives known per se, such as curing agents, wetting agents and release agents. For further information regarding amino resins, reference is made to the specialist literature, in particular to Ullmann's Encyclopedia of Industrial Chemistry, Wiley VCH Publishers, Weinheim, 2003, 6th edition, volume 2, page 537 to 565, or Becker and Braun, Kunststoffhandbuch 10 Duroplaste, (Plastics Handbook 10 Thermosets), Carl Hansa Publishers, München Wien, 1988, 2nd edition, page 41 to 51.

"Nonwovens", within the scope of the present invention, denote a structure formed form fibers of delimited length, endless fibers (filaments) or cut threads, which are joined together arbitrarily to form a nonwoven (a fibrous layer, a fibrous we(b) and have been interconnected arbitrarily, wherein the interweaving or intertwining of threads is ruled out, as occurs with weaving, knotting, knitting, lace production, braiding and the production of tufted products. Furthermore, sheetings and papers are not nonwovens.

Preferred nonwovens are flat, flexible, textile structures, which are constructed from continuous fibers, staple fibers and/or from chopped fibers.

Within the scope of the present invention, the nonwoven comprises polyester fibers and polyamide fibers.

Preferred polyester fibers comprise polybutylene terephthalate (PBT) repeat units and/or polyethylene terephthalate (PET) repeat units, wherein polyester fibers which comprise at least 50% by weight, preferably at least 75% by weight, in particular at least 90% by weight, of polyethylene terephthalate (PET) repeat units are particularly preferred.

Preferred polyamide fibers comprise aliphatic polyamides in which the monomers are derived from aliphatic main bodies, such as polyamides which comprise repeat units of ε-Caprolactam (polycaprolactam, PA 6 for short) or of hexamethylenediamine and adipic acid (PA 66); semi-aromatic polyamides in which the monomers are derived in part from aromatic main bodies, such as polyamides which comprise repeat units of hexamethylenediamine and terephthalic acid (PA 6T); and also aromatic polyamides, in which the monomers are derived from aromatic main bodies, such as polyamides which comprise repeat units of para-phenylenediamine and terephthalic acid (aramid). Here, polyamide fibers which comprise at least 50% by weight, preferably at least 75% by weight, in particular at least 90% by weight, of repeat units of ε-Caprolactam have proven to be particularly useful for the purposes of the present invention.

The respective proportions of the polyester fibers and of the polyamide fibers can be selected freely in principle. However, nonwovens which, in each case in relation to their total weight, comprise (i) 5.0% by weight to 95.0% by weight, preferably 25.0% by weight to 80.0% by weight, particularly preferably 50.0% by weight to 70.0% by weight, in particular 55.0% by weight to 65.0% by weight, of polyester fibers, and (ii) 5.0% by weight to 95.0% by weight, preferably 20.0% by weight to 75.0% by weight, particularly preferably 30.0% by weight to 50.0% by weight, in particular 35.0% by weight to 45.0% by weight, of polyamide fibers, wherein the proportion of further constituents is preferably less than 25.0% by weight, preferably less than 10.0% by weight, particularly preferably less than 5.0% by weight, and in particular is less than 1.0% by weight, are preferably used.

The thickness of the nonwoven preferably lies in the range from 0.1 mm to 10.0 mm, preferably in the range from 0.2 mm to 1.0 mm, and in particular in the range from 0.3 mm to 0.6 mm.

In accordance with the invention, the mean diameter of the polyester fibers is preferably less than 15 μm, preferably less than 10 μm, particularly preferably less than 7.5 μm, and in particular is in the range from 1 μm to 5 μm.

The mean diameter of the polyamide fibers is preferably less than 15 μm, preferably less than 10 μm, particularly preferably less than 7.5 μm, and in particular is in the range from 1 μm to 5 μm.

The ratio of the mean diameter of the polyester fibers to the mean diameter of the polyamide fibers preferably lies in the range from 10:1 to 1:10, preferably in the range from 5:1 to 1:5, particularly preferably in the range from 3:1 to 1:1, and in particular in the range from 2:1 to >1:1.

The length of the polyester fibers in principle does not cause any specific restrictions. Within the scope of a first preferred embodiment of the present invention, what are known as endless filaments are used. Within the scope of a further preferred embodiment of the present invention, polyester fibers having staple fiber lengths in the range from 0.5 mm to 200 mm, preferably in the range from 1 mm to 100 mm, in particular in the range from 1.5 mm to 60 mm, are used.

The length of the polyamide fibers in principle does not cause any specific restrictions. Within the scope of a first preferred embodiment of the present invention, what are known as endless filaments are used. Within the scope of a further preferred embodiment of the present invention, polyamide fibers having staple fiber lengths in the range from 0.5 mm to 200 mm, preferably in the range from 1 mm to 100 mm, in particular in the range from 1.5 mm to 60 mm, are used.

The titre of the polyester fibers preferably lies in the range from 0.01 dtex to 25.0 dtex and is preferably less than 10.0 dtex, expediently less than 5.0 dtex, particularly preferably less than 1.0 dtex, even more preferably less than 0.5 dtex, and in particular less than 0.3 dtex.

The titre of the polyamide fibers preferably lies in the range from 0.01 dtex to 25.0 dtex and is preferably less than 10.0 dtex, expediently less than 5.0 dtex, particularly preferably less than 1.0 dtex, even more preferably less than 0.5 dtex, and in particular less than 0.3 dtex.

The weight per unit area of the nonwoven preferably lies in the range from 25 g/m$^2$ to 250 g/m$^2$, preferably in the range from 40 g/m$^2$ to 200 g/m$^2$, particularly preferably in the range from 60 g/m$^2$ to 150 g/m$^2$, in particular in the range from 80 g/m$^2$ to 120 g/m$^2$.

The density of the nonwoven preferably lies in the range from 50 kg/m$^3$ to 500 kg/m$^3$, preferably in the range from 100 kg/m$^3$ to 350 kg/m$^3$.

The tensile strength of the nonwoven in the machine direction is preferably at least 150 N/mm², preferably at least 200 N/mm², in particular at least 225 N/mm². The tensile strength is preferably established in accordance with EN 13934-1.

The tensile strength of the nonwoven crosswise to the machine direction is preferably at least 100 N/mm², preferably at least 150 N/mm², in particular at least 175 N/mm². The tensile strength is preferably established in accordance with EN 13934-1.

The terms "machine direction" and "crosswise to the machine direction" refer to the orientation of the material during production thereof. Since these directions, in some circumstances, may no longer be identifiable however on the resultant product, the term "machine direction" within the scope of this invention denotes a first direction of the material, which in principle is to be determined arbitrarily, and the term "crosswise to the machine direction" within the scope of this invention denotes a second direction of the material, which is perpendicular (crosswise) to the first direction.

The tear strength of the nonwoven in the machine direction is preferably at least 5 N/mm², preferably at least 6 N/mm², in particular at least 7 N/mm². The tear strength is preferably established in accordance with EN 13937.

The tear strength of the nonwoven crosswise to the machine direction is preferably at least 5 N/mm², preferably at least 6 N/mm², in particular at least 7 N/mm². The tear strength is preferably established in accordance with EN 13937.

The elongation of the nonwoven at maximum tensile force in the machine direction is preferably at least 10%, preferably at least 25%, and in particular lies in the range from 30% to 50%. The elongation at maximum tensile force is preferably established in accordance with EN 13934-1.

The elongation of the nonwoven at maximum tensile force crosswise to the machine direction is preferably at least 20%, preferably at least 35%, and in particular lies in the range from 45% to 65%. The elongation at maximum tensile force is preferably established in accordance with EN 13934-1.

The ash content of the aminoplastic-nonwoven impregnate is preferably less than 1.0% by weight, preferably less than 0.5% by weight, and in particular less than 0.25% by weight.

The air permeability of the aminoplastic-nonwoven impregnate is as high as possible and is therefore expediently measured through a number of layers. The air permeability is preferably at least 0.5 ml/s, preferably at least 1.0 ml/s, in particular at least 1.5 ml/s, wherein the measurement is preferably taken on a nonwoven having a weight per unit area greater than 500 g/m², preferably greater than 750 g/m², particularly preferably greater than 1000 g/m², and in particular greater than 1250 g/m², or on a number of layers of the nonwoven having a total weight per unit area greater than 500 g/m², preferably greater than 750 g/m², particularly preferably greater than 1000 g/m², in particular greater than 1250 g/m².

The weight per unit area of the aminoplastic-nonwoven impregnate is preferably at least 50 g/m², preferably at least 100 g/m² to 500 g/m², particularly preferably 150 g/m² to 400 g/m², in particular 200 g/m² to 300 g/m².

Within the scope of the present invention, the aminoplastic of the aminoplastic-nonwoven impregnate is partially cured. The viscosity of the aminoplastic, in each case measured at 20° C., is preferably greater than 200 mPas.

The residual moisture of the aminoplastic-nonwoven impregnate according to the invention, in relation to its total weight, is at least 4% by weight and preferably less than 10.0% by weight, preferably less than 8.0% by weight, in particular less than 7.0% by weight. It is preferably established in accordance with standard EN 20287 after 24 hours of drying in a drying cabinet at 105° C., preferably after 48 hours in a drying cabinet at 105° C.

The amino resin film according to the invention is obtainable by at least partial curing of the aminoplastic-nonwoven impregnate and has a residual moisture of less than 4.0% by weight, preferably less than 3.0% by weight, particularly preferably less than 2.0% by weight, expediently less than 1.0% by weight, and in particular less than 0.75% by weight.

The amino resin film according to the invention is characterized, inter alia by a high flexibility and very good mechanical flexibility. Its bending strength, measured in accordance with EN ISO 178 in a three-point flexure test, is preferably at most 160 N/mm², preferably at most 125 N/mm², particularly preferably at most 100 N/mm², expediently at most 75 N/mm², in particular at most 50 N/mm².

The ratio of the bending modulus in the longitudinal direction to the bending modulus in the crosswise direction preferably lies in the range from 1:10 to 10:1, preferably in the range from 1:1.3 to 1.3:1, particularly preferably in the range from 1:1.1 to 1.1:1, and in particular in the range from 1:1.05 to 1.05:1.

The modulus of elasticity of the amino resin film according to the invention, measured in accordance with EN ISO 178, is preferably at most 15 N/mm², preferably at most 10 N/mm², particularly preferably at most 7.5 N/mm², and in particular less than 5 N/mm².

The ratio of the modulus of elasticity in the longitudinal direction to the modulus of elasticity in the crosswise direction lies preferably in the range from 1:10 to 10:1, preferably in the range from 1:1.3 to 1.3:1, particularly preferably in the range from 1:1.2 to 1.2:1, expediently in the range from 1:1.1 to 1.1:1, and in particular in the range from 1:1.05 to 1.05:1.

The tensile strength of the amino resin film according to the invention is preferably at least 150 N/mm², preferably at least 200 N/mm², in particular at least 225 N/mm². The tensile strength is preferably established in accordance with EN 13934-1.

The elongation of the amino resin film at maximum tensile force is preferably at least 10%, preferably at least 25%, and in particular lies in the range from 30% to 65%. The elongation at maximum tensile force is preferably established in accordance with EN 13934-1.

Within the scope of the present invention, all specified values, unless expressly stated otherwise, are established under the usual conditions, if in doubt at room temperature (20° C.).

The improved deformability of the amino resin films according to the invention can be used both in the case of cold forming, preferably at temperatures below 100° C., in particular at temperatures in the range from 15° C. to 50° C., and in the case of hot forming, preferably at temperatures above 100° C. in particular at temperatures in the range from 110° C. to 160°, to produce three-dimensionally formed objects, wherein the advantages of the present invention are evident in particular when implementing tight radii, wherein the ratio of bending radius to the thickness of the amino resin film is preferably greater than 5, preferably greater than 7, and in particular greater than 8.

The improved deformability of the amino resin film according to the invention is also demonstrated in particular as a result of the fact that deformations domed over large areas are possible with the material.

For preferred amino resin films, the bending stress after a displacement of 6 mm is less than 140 N/mm$^2$, preferably less than 125 N/mm$^2$, particularly preferably less than 100 N/mm$^2$, expediently less than 75 N/mm$^2$, in particular less than 50 N/mm$^2$. The bending stress after a displacement of 6 mm is preferably established in accordance with EN 310.

The amino resin film according to the invention is preferably translucent and allows the presentation of particularly deep structures. Here, the opacity of the amino resin film with a structure formed purely from aminoplastic-nonwoven sheetings is determined by the layer thickness. The more layers in the structure, the less translucent it is.

If a mixed structure with decorative paper and aminoplastic-nonwoven sheetings or a mixed structure with core paper and aminoplastic-nonwoven sheetings is used, there is no opacity, by contrast.

For the purposes of the present invention, the opacity of the amino resin film is favorably established using the Dr. Lange measurement system, spectro color diffuse/8° under normal light: D65/10°. Here, particularly advantageous amino resin films have a reflection value (Y) greater than 0, preferably greater than 10, particularly preferably greater than 20, and in particular greater than 50.

The specific density of the amino resin film according to the invention is comparatively low and is preferably less than 1.50 g/cm$^3$, preferably less than 1.40 g/cm$^3$, and in particular is in the range from 1.3 g/cm$^3$ to 1.39 g/cm$^3$.

The thickness of the amino resin film according to the invention is not subject to any specific restrictions. For self-supporting embodiments, thicknesses greater than 1.0 mm, preferably greater than 1.2 mm, in particular greater than 1.5 mm, have proven to be particularly suitable, however.

Furthermore, the amino resin film according to the invention demonstrates thermoset behavior at comparatively low temperatures, generally at temperatures below 160° C., preferably below 150° C.

The aminoplastic-nonwoven impregnate can be produced in a manner known per se by impregnating the nonwoven with the necessary quantity of the amino resin followed by partial curing of the amino resin.

To produce the amino resin film, the aminoplastic-nonwoven impregnate is expediently introduced between two press means, is pressed, and is at least partially cured. "Press means" within the scope of the present invention denote all means suitable for pressing, such as press plates and dies.

For pressing, a press having a smooth, high-gloss and abrasion-resistant surface, which is coated with titanium diboride, zirconium diboride, hafnium diboride, molybdenum diboride, tantalum diboride, tungsten diboride or vanadium diboride, are preferably used. The aminoplastic-nonwoven impregnate is preferably coated with this diboride in a magnetron sputtering coating system and preferably has a Vickers hardness of at least 2000. Press means as disclosed in European patent application EP 0 826 790 have proven to be particularly suitable. Within the scope of a further particularly preferred variant of the present invention, aluminum molds are used as press means.

The structure is preferably pressed at a temperature in the range from 110° C. to 160° C., particularly preferably in the range from 120° C. to 150° C., and at increased pressure, preferably of at least 1.5 N/mm$^2$, particularly preferably at least 5 N/mm$^2$, in particular between 6 N/mm$^2$ and 15 N/mm$^2$. The press time preferably lies in the range from 10 minutes to 90 minutes, particularly preferably in the range from 15 minutes to 50 minutes.

The simultaneous use of heat and high pressure enables the flowing and subsequent curing of the binders.

Within the scope of a particularly preferred variant of the present invention, the aminoplastic-nonwoven impregnate according to the invention is used to produce a laminate. In this context, laminates which comprise
 (a) a core layer,
 (b) an amino resin film according to the invention and
 (c) optionally a decorative layer
are particularly preferred.

Here, one or more sheets of kraft paper are preferably contained in the core layer of the laminate.

"Kraft paper" in accordance with DIN 6730 is a paper which consists predominantly of kraft-process pulp, to which kraft-process pulp paper can be added, and which has a high strength, in particular a high tensile strength, and a high resistance. Kraft paper is usually produced to a degree of at least 90% from fresh, preferably unbleached, sulfate pulp (kraft-process pulp). Furthermore, besides the pulp, kraft paper may also contain starch, alum and/or size, for example in order to achieve specific surface effects and strength increases. For the purposes of the present invention, kraft paper with a grammage from 100 g/m$^2$ to 300 g/m$^2$, in particular 150 g/m$^2$ to 200 g/m$^2$, has proven to be particularly advantageous. A preferred kraft paper is sodium kraft paper, with which a person skilled in the art of HPLs will be familiar.

The number of used kraft paper sheets is substantially dependent on the desired thickness of the core layer or the laminate. The laminate of the present invention preferably contains 1 to 8 sheets, preferably 3 to 7 sheets, and in particular 4 to 6 sheets, of kraft paper.

The weight of the kraft paper used in accordance with the invention is not further restricted. It is dependent in particular on the number of used kraft paper sheets and therefore on the desired thickness of the laminate. In accordance with a preferred embodiment, the weight of the used kraft paper sheets lies in the range from 125 g/m$^2$ to 250 g/m$^2$, preferably in the range from 140 g/m$^2$ to 230 g/m$^2$.

The amino resin film according to the invention is preferably applied to one side of the core layer of the laminate formed from kraft paper.

Within the scope of a preferred embodiment of the present invention, no further layer is arranged over the amino resin film according to the invention. Here, at least one decorative layer, which preferably comprises a sheet of decorative paper, may optionally be arranged on the other side of the laminate.

Within the scope of a further preferred embodiment of the present invention, at least one decorative layer, which preferably comprises a sheet of decorative paper, is arranged over the amino resin film according to the invention. Alternatively, the nonwoven used in accordance with the invention may also be printed directly.

Due to the decorative paper or due to the printed nonwoven, the laminate receives a particular appearance. The decorative layer therefore denotes the layer applied to the core layer, the pattern of the applied layer being visually perceivable by the observer.

Used herein, decorative paper relates to any material that is suitable for connection to the underlying core layer and optionally to the overlay layer arranged above and that can portray a decoration. The preferred material for the decorative paper is paper. However, equivalent sheetings, for example plastic sheetings, or veneers may also be included by the term decorative paper. Veneers are wooden sheets which generally have a thickness from 0.1 mm to 3 mm and can provide the decorative layer with the appearance of wood, for example a specific grain.

The decoration is usually applied to the decorative paper or the nonwoven by means of a printing process. For example, any motif can thus be created by means of photographic reproduction and printed onto the decorative paper by means of an intaglio printing method or digital printing method. The motif, for example, may consist of wood, stone, ceramic, color and/or fantasy patterns. Furthermore, the motif may also be produced however by brushing the decorative paper with one or more colors.

The weight per unit area of the used decorative paper is not further restricted. The weight per unit area preferably lies in the range from 40 $g/m^2$ to 145 $g/m^2$, more preferably in the range from 60 $g/m^2$ to 100 $g/m^2$, in particular at 70 $g/m^2$ to 90 $g/m^2$.

Further layers, such as an underlay layer, may optionally be arranged between the core layer and the amino resin film, between the amino resin film and the optional decorative layer, and/or between the core layer and the optional decorative layer. This underlay layer may be used for example to prevent warping of the laminate or to reduce electrostatic charges. The underlay layer preferably comprises one or more sheets of kraft paper.

If the laminate comprises an overlay layer, this then preferably forms the top layer for the laminate and is applied to the decorate layer. The overlay layer comprises one or more sheets of a preferably fibrous material.

The weight per unit area of the sheets used for the overlay layer is not further restricted. It preferably lies in the range from 12 $g/m^2$ to 40 $g/m^2$, more preferably in the range from 20 $g/m^2$ to 35 $g/m^2$ and even more preferably in the range from 25 $g/m^2$ to 32 $g/m^2$.

The overlay material preferably has high resistance to chemical, thermal and mechanical load. If fibrous material is used for the production of the overlay, this fibrous material then preferably contains bleached pulp fiber, in particular cellulose, for example α-cellulose. The overlay material is preferably of such a character that it ensures that the motif of the decorative paper layer arranged beneath the overlay is visible once pressed to form the composite material. The overlay therefore preferably has a high degree of transparency.

In accordance with a preferred embodiment, the binder, which in the cured state connects the kraft paper sheets to one another and connects the core layer formed from the kraft paper sheets to the amino resin film and, where applicable, to the decorative layer, is a hot curing resin. Preferred binders are liquid or liquefiable resins, which cure on their own or with reaction agents, for example hardeners or accelerators, without cleaving of volatile components by polymerization or polyaddition via crosslinking reactions to form thermosets. Phenolic resins have proven to be particularly preferable for this purpose. Phenolic resins are defined in accordance with DIN 16916, part 1 and ISO 10082 as condensation products of phenols and aldehydes. Unsubstituted phenol and formaldehyde are the primary raw materials for producing phenolic resins. For details regarding the chemistry of phenolic resins, reference is made to the following literature: A. Gardziella, L. A. Pilato, A. Knop, "*Phenolic Resins*", Springer Publishers, Berlin, Heidelberg, New York, Tokio, 1999; A. Gardziella, H. G. Haub, "*Phenolharze*" ("Phenolic Resins") in: Kunststoff Handbuch (Plastics Handbook), volume 10, "*Duroplaste*" ("Thermosets"), p. 12-40, Carl Hanser Publishers, München, Wien, 1988; P. Adolphs, E. Giebeler, P. Stäglich, "*Houben-Weyl, Methoden der Organischen Chemie*" (Houben-Weyl, Organic Chemistry Methods"), volume E20, part 3, p. 1974-1810, 4th edition, Georg Thieme Publishers, Stuttgart. In accordance with a rather particular preferred embodiment, phenol formaldehyde resin is used as binder for the kraft paper sheets.

If an underlay layer is provided between the core layer and the amino resin film, between the amino resin film and the optional decorative layer, and/or between the core layer and the optional decorative layer, the binder, which, where applicable, connects the underlay sheets to one another, the core layer to the underlay layer and the underlay layer to the nonwoven impregnate and/or the optional decorative layer, is then preferably one of the previously described hot-curing resins, particularly preferably one of the previously described aminoplastics, for example a melamine formaldehyde resin or a melamine urea formaldehyde resin or a melamine formaldehyde acrylate resin.

It is clear to a person skilled in the art that the used binders may mix in particular at the interfaces between individual layers, for example the interfaces between the core layer and amino resin film, and that the boundaries between the individual layers are not usually defined by the used binder, but above all by the outermost sheets forming the individual layers.

The previously described laminate is preferably obtained in that a structure is produced which contains the kraft paper sheets, a nonwoven saturated in aminoplastic, and optionally the decorative paper sheet and optionally the overlay sheet and a suitable binder system, this structure is introduced between special press means, is pressed, and the binder system is cured during this process.

In accordance with the invention, a binder system is understood to mean an individual suitable binder or a combination of suitable binders. Suitable binders are preferably understood to mean binders which have been described previously as being preferred for the connection of the individual layers contained in the laminate or for the connection of the sheets forming the layers.

Although within the scope of this description, reference is made to "the" decorative paper sheet and "the" overlay sheet, a person skilled in the art will be aware that a plurality of decorative paper sheets or overlay sheets can also be used depending on the desired character of the laminate. The structure of the laminate or of the structure containing a plurality of decorative paper sheets or of overlay sheets is produced as a matter of course for a person skilled in the art from the below embodiments.

To produce the structure, individual sheets and also the nonwoven, preferably all sheets and the nonwoven, of the various layers are preferably impregnated with a suitable binder.

In accordance with a further preferred embodiment, the kraft paper sheets provided in the structure are preferably impregnated with a phenol formaldehyde resin. The binder content of the impregnated kraft paper sheet preferably lies in the range from 25% by weight to 55% by weight, more preferably in the range from 28% by weight to 36% by weight, and even more preferably in the range from 30% by weight to 34% by weight. The decorative paper sheet preferably present in the structure is expediently impregnated with a melamine formaldehyde resin or a melamine urea formaldehyde resin or a melamine formaldehyde acrylate resin. The binder content of the impregnated decorative sheet depends, inter alia, on the motif of the decorative sheet. With plain-colored decorations, the binder content of the impregnated decorative sheet preferably lies in the range from 35% by weight to 65% by weight, more preferably in the range from 42% by weight to 60% by weight, and even more preferably in the range from 48% by weight to 55% by weight. In the case of multi-colored decorative motifs produced by patterns or otherwise printed, the binder content of the impregnated decorative sheet preferably lies in the range from 35% by weight to 65% by weight, more preferably in the range from 37% by weight to 50% by weight and even more preferably in the range from 40% by weight to 45% by weight. The binder content of the overlay sheet optionally present in the structure preferably lies in the range from 60% by weight to 90% by weight, more preferably in the range from 65% by weight to 86% by weight, and even more preferably in the range from 70% by weight to 83% by weight.

A structure prepared in accordance with the invention is then introduced between two press means and is pressed. For the pressing process, press means having a smooth, high-gloss and abrasion-resistant surface, which is coated with titanium diboride, zirconium diboride, hafnium diboride, molybdenum diboride, tantalum diboride, tungsten diboride or vanadium diboride, are preferably used. The structure is coated with this diboride preferably in a magnetron sputtering coating system and preferably has a Vickers hardness of at least 2000. Press means as disclosed in European patent application EP 0 826 790 have proven to be particularly suitable. Within the scope of a further particularly preferred variant of the present invention, aluminum molds are used as press means.

The used pressed means or press surfaces may also have the form of three-dimensional press molds, which correspond rather to a press ram and a force-locked mating piece. The used material can thus be cured to form three-dimensional shaped parts. The quality of the surface here is determined decisively by the surface character of the press means.

The structure is preferably pressed at a temperature in the range from 110° C. to 160° C., particularly preferably in the range from 120° C. to 150° C., and at increased pressure preferably of at least 1.5 N/mm$^2$, preferably at least 5 N/mm$^2$, particularly preferably at least 7.5 N/mm$^2$, in particular at least 10 N/mm$^2$. The press time preferably lies in the range from 40 minutes to 90 minutes, particularly preferably in the range from 50 minutes to 80 minutes.

The simultaneous use of heat and high pressure enables the flowing and subsequent curing of the binders.

The product obtained once the structure has been pressed and once the resins have cured is ultimately referred to as a laminate.

Depending on the selected structure, the finished laminate has different thicknesses. Conventional thicknesses lie in the range from 0.2 mm to 2 mm, preferably in the range from 0.6 mm to 1.5 mm, and particularly preferably in the range from 0.8 mm to 1.2 mm. It is also possible however to produce laminates having much greater thicknesses, for example in the range from 2 mm to 20 mm.

If the laminate contains an overlay layer, the thickness thereof then lies preferably in the range from 80 µm to 120 µm, particularly preferably in the range from 80 µm to 110 µm. The thickness of the decorative layer preferably lies in the range from 65 µm to 140 µm, particularly preferably in the range from 65 µm to 80 µm. Depending on the desired thickness of the laminate, the thickness of the core layer may vary widely and preferably lies in the range from 250 µm to 1900 µm, particularly preferably in the range from 500 µm to 1500 µm.

If the laminate does not contain an overlay layer, the thickness of the decorative layer then likewise preferably lies in the range from 65 µm to 140 µm, particularly preferably in the range from 80 µm to 140 µm.

The thickness of the amino resin film preferably lies in the range from 0.15 mm to 0.60 mm, particularly preferably in the range from 0.25 mm to 0.45 mm.

The thickness of the core layer, independently of the presence of an overlay layer, may lie for example in the range from 250 µm to 1900 µm, particularly preferably in the range from 500 µm to 1500 µm.

The end weight of the laminate according to the invention is dependent on a number of factors, for example the thickness of the laminate, the weight of the used components, and the number of used sheets and nonwovens. The weight of the laminate preferably lies in the range from 1.2 kg/m$^2$ to 1.6 kg/m$^2$ of the surface of the laminate, particularly preferably in the range from 1.3 kg/m$^2$ to 1.5 kg/m$^2$, for example 1.4 kg/m$^2$.

Within the scope of a particularly preferred variant of the present invention, the laminate according to the invention is a continuous pressing laminate (CPL), which is preferably produced in a continuous method. It is preferably present in board form or as a rolled product and for example is used for the coating of door panels.

The CPL can be produced, similarly to the other laminates, by pressing a structure which comprises the individual sheets and also the nonwoven, wherein the individual sheets and also the nonwoven, preferably all sheets and the nonwoven, of the various layers are preferably impregnated with a suitable binder.

The structure prepared in accordance with the invention is then introduced between two pressed means, preferably between two press belts, and is pressed. For the pressing process, press means having a smooth, high-gloss and abrasion-resistant surface, which is coated with titanium diboride, zirconium diboride, hafnium diboride, molybdenum diboride, tantalum diboride, tungsten diboride or vanadium diboride, are preferably used. The structure is coated with this diboride preferably in a magnetron sputtering coating system and preferably has a Vickers hardness of at least 2000. Press means as disclosed in European patent application EP 0 826 790 have proven to be particularly suitable.

The structure is preferably pressed at a temperature in the range from 110° C. to 190° C., particularly preferably in the range from 120° C. to 190° C., and at increased pressure preferably of at least 1.5 N/mm$^2$, preferably at least 5 N/mm$^2$, particularly preferably at least 7.5 N/mm$^2$, in particular at least 10 N/mm$^2$. The pressing time preferably lies in the range from 1 minute to 90 minutes, particularly preferably in the range from 1 minute to 12 minutes.

The simultaneous use of heat and high pressure enables the flowing and subsequent curing of the binders.

The product obtained once the structure has been pressed and the resins have cured is ultimately referred to as a continuous pressed laminate, or CPL.

In accordance with a further aspect, the invention relates to a composite body which comprises a substrate and a laminate adhering on the substrate. The composite body is preferably a panel, in particular a base board (floor panel). Furthermore, the panel may also be a different board however, for example a table top. Further preferred composite bodies include furniture, in particular seat buckets, and car parts, in particular car parts for the motor vehicle interior.

Preferred substrates are mounting plates, plywood, carrier boards (optionally coated with laminate), highly compressed fiberboards, medium-density fiberboards, hard fiberboards, coreboard, veneers and veneer boards, plywoods, solid wood, honeycomb, foam materials, metal plates, sheet metals, mineral substrates, natural and artificial stone, tile and plasterboard. The substrates may be coated with a suitable binder, such as a melamine resin, or may be uncoated. The laminate can be applied both to liquid-absorbing (absorbent) substrates, such as uncoated clamping boards and uncoated wood, and to non-liquid-absorbing (non-absorbent) substrates, such as metals, ceramic, glass, coated woods, coated clamping boards, etc.

Methods and means for fixedly connecting laminate and substrate are known from the prior art. For example, laminate and substrate can be fixedly connected by bonding or with the aid of connection elements known from the prior art.

Laminate and substrate are preferably fixedly connected by pressing, wherein, instead of the laminate, the corresponding impregnated sheets and/or the impregnated nonwoven, which are used to produce the laminate, are preferably used. The structure is expediently introduced between two press means, is pressed, and at least partially cured. For the pressing process, press means having a smooth, high-gloss and abrasion-resistant surface, which is coated with titanium diboride, zirconium diboride, hafnium diboride, molybdenum diboride, tantalum diboride, tungsten diboride or vanadium diboride, are preferably used. The coating with this diboride preferably takes place in a magnetron sputtering coating system and preferably has a Vickers hardness of at least 2000. Press means as are disclosed in European patent application EP 0 826 790 have proven to be particularly suitable. Within the scope of a further particularly preferred variant of the present invention, aluminum molds are used as press means.

The structure is preferably pressed at a temperature in the range from 110° C. to 160° C., particularly preferably in the range from 120° C. to 150° C., and at increased pressure preferably of at least 1.5 N/mm$^2$, particularly preferably at least 5 N/mm$^2$, in particular between 6 N/mm$^2$ and 15 N/mm$^2$. The pressing time preferably lies in the range from 1 minute to 90 minutes, particularly preferably in the range from 15 minutes to 50 minutes.

The composite body may additionally comprise further functional materials known from the prior art. For example, materials for flame protection, for shielding of radiation, for soundproofing, for stabilization, and for providing a moisture barrier are known. Preferred functional materials comprise a stabilizing layer and/or impact sound insulation, as are preferably used in base boards.

The thickness of the composite body is not further limited. It lies preferably in the range from 9.0 mm to 15.0 mm, particularly preferably in the range from 10.0 mm to 14.0 mm, and most preferably in the range from 11.0 mm to 13.0 mm. The thickness of the laminate provided in the composite body, as described above, may preferably lie in the range from 0.2 mm to 2.0 mm, particularly preferably in the range from 0.6 mm to 1.5 mm, and most preferably in the range from 0.8 mm to 1.2 mm. The thickness of the substrate, for example of a highly compressed fiberboard, lies preferably in the range from 5.0 mm to 13.0 mm, particularly preferably in the range from 8.0 mm to 10.0 mm, most preferably in the range from 9.0 mm to 9.6 mm. The stabilizing layer and/or the impact sound insulation optionally provided preferably have a thickness in the range from 0.5 mm to 3.0 mm, particularly preferably in the range from 1.0 mm to 2.0 mm.

The end weight of the composite body is not particularly restricted. It lies preferably in the range from 8 kg/m$^2$ to 13 kg/m$^2$ of the surface of the composite body, particularly preferably in the range from 9 kg/m$^2$ to 12 kg/m$^2$ and most preferably in the range from 10 kg/m$^2$ to 11 kg/m$^2$.

The composite body according to the invention can be processed in ways that are self-evident to a person skilled in the art. If the composite body is a base board, this may then be provided with a tongue-and-groove structure in order to enable connection of a plurality of such base boards over an area in order to produce plank-like or tile-like structures.

A further preferred application of the amino resin films according to the invention is their use as a press mold for the production of three-dimensional shaped articles by means of compression molding methods.

In accordance with a first particularly preferred variant of the present invention, one or more layers of the aminoplastic-nonwoven impregnate according to the invention are introduced here into a suitable tool, preferably into a suitable press mold, and are cured under pressure.

The structure is preferably pressed at a temperature in the range from 110° C. to 160° C., particularly preferably in the range from 120° C. to 150°, and at increased pressure preferably of at least 1.5 N/mm$^2$, preferably at least 5 N/mm$^2$, particularly preferably at least 7.5 N/mm$^2$, in particular at least 10 N/mm$^2$. The pressing time preferably lies in the range from 1 minute to 90 minutes, particularly preferably in the range from 50 minutes to 80 minutes.

The simultaneous use of heat and high pressure enables the flowing and subsequent curing of the binders.

The shaped article produced may be self-supporting depending on the thickness. The surface quality of the used tool substantially determines the surface quality of the product. The product shows the typical surface qualities of a laminate pressed at high pressure.

In accordance with a second particularly preferred variant of the present invention, one or more layers of aminoplastic-nonwoven impregnate are introduced, together with a substrate, for example with sized plywood veneers for seat shells, into a suitable tool, preferably into a suitable press mold, and are cured under pressure.

The structure is preferably pressed at a temperature at a range from 110° C. to 160° C., particularly preferably in the range from 120° C. to 150°, and at increased pressure preferably of at least 1.5 N/mm$^2$, preferably at least 5 N/mm$^2$, particularly preferably at least 7.5 N/mm$^2$, in particular at least 10 N/mm$^2$. The pressing time preferably lies in the range from 1 minute to 90 minutes, particularly preferably in the range from 50 minutes to 80 minutes.

The surface quality of the product is determined substantially by the surface quality of the used tool. The product shows the typical surface qualities of a laminate pressed at high pressure.

In addition, due to the advantageous property profile, the use of the aminoplastic-nonwoven impregnate according to the invention, of the amino resin film according to the invention, of the laminate according to the invention, of the composite body according to the invention, and of the press mold according to the invention for the production of furniture, worktops, window ledges, doors and car parts, in particular for the production of shower screens, baseboards, end profiles, profile moldings, casings, seat shell coating for interior and exterior applications, compression molded parts, preferably for decorative or structural parts, door frames, door panels, transparent laminates for advertising and billboards, roof slab elements, preferably in trapezoid or wave form, wall claddings, termination bars, preferably for sealing purposes, and car fittings or parts thereof, is particularly favorable.

The present invention is explained further by the following examples, which are not to be understood as limiting, however.

Practical Example 1

Production of a Nonwoven Impregnate

A plastic nonwoven formed from a polyester/polyamide copolymer with a weight per unit area of nominally 100 g/m$^2$ was impregnated with 52% of an approximately 50-55% aqueous melamine resin solution (incl. hardening agent, wetting agent and release agent). The excess resin was removed on the surface between two polished steel rolls. The impregnated nonwoven was left to dry for 2 minutes at room temperature and then for 2 minutes at 130° C. in an ambient air drying cabinet in order to obtain a pre-impregnated plastic nonwoven. Further details regarding the materials used and the nonwoven impregnate obtained are summarized in Table 1:

TABLE 1

| | |
|---|---|
| polyester fibers: PET repeat units [% by weight] | >90 |
| polyamide: PA 6 repeat units [% by weight] | >90 |
| proportion of polyester fibers [% by weight] | 60 |
| proportion of polyamide fibers [% by weight] | 40 |
| fiber length of the polyester fibers | endless |
| fiber length of the polyamide fibers | endless |
| thickness of the nonwoven [mm] | 0.37 |
| mean diameter of the polyester fibers [μm] | 3.5 |
| mean diameter of the polyamide fibers [μm] | 2.5 |
| titre of the polyester fibers [dtex] | 0.1-0.2 |
| titre of the polyamide fibers [dtex] | 0.1-0.2 |
| tensile strength of the nonwoven (EN 13934-1; m)[1] [N/mm$^2$] | 250 |
| tensile strength of the nonwoven (EN 13934-1; cd)[2] [N/mm$^2$] | 200 |
| tear strength (EN 13937) of the nonwoven (m)[1] [N/mm$^2$] | 8 |
| tear strength (EN 13937) of the nonwoven (cd)[2] [N/mm$^2$] | 8 |
| elongation of the nonwoven at maximum tensile force (EN 13934-1; m)[1] % | 40 |
| elongation of the nonwoven at maximum tensile force (EN 13934-1; cd)[2] % | 55 |
| weight per unit area of the nonwoven [g/m$^2$] | 100 |
| residual moisture of the nonwoven impregnate [% by weight] | 6 |

[1](m): in the machine direction
[2](cd): crosswise to the machine direction

Practical Example 2

Production of an Amino Resin Film

To produce an amino resin film, a structure suitable for pressing by means of two press plates was first produced.

To this end, 24 sheets of plastic nonwoven, which had been impregnated with the melamine resin (practical example 1), were combined.

A structure of this type is illustrated in Schema 1.

Press plate made of steel, possibly with a surface coating (chromium; titanium diboride)
24 sheets of impregnated plastic nonwoven
Press plate made of steel, possibly with a surface coating (chromium; titanium diboride)
Schema 1: Structure for Producing a Board According to the Invention The structure prepared in this way was pressed between two press plates as structure provider at a pressure of 8-10 N/mm$^2$ and a maximum temperature of 145° C. for 25 min and was then cooled to room temperature. The residual moisture of the resultant amino resin film was less than 0.5% by weight.

Practical Example 3

An aminoplastic-kraft paper resin film was produced similarly to practical example 2. Here, the same melamine formaldehyde resin as in practical example 2 was used.

Practical Example 4

An aminoplastic high decorative paper resin film was produced similarly to practical example 2. Here, the same melamine formaldehyde resin as in practical example 2 was used.

Results

The resin films obtained in practical examples 2 to 4 were examined in terms of their strength. The density was determined in accordance with EN ISO 1183-1. The mechanical strengths were established in accordance with EN ISO 178 in a three-point flexure test. The obtained values are presented in Table 2.

TABLE 2

| Practical example | Board thickness [mm] | Bending strength [N/mm$^2$] lengthwise/ crosswise | Modulus of elasticity [N/mm$^2$] lengthwise/ crosswise | density [g/cm$^3$] |
|---|---|---|---|---|
| 2 | 4.75 | 94.70/91.06 | 4.158/4.044 | 1.35 |
| 3 | 5.22 | 180.30/137.05 | 16.407/11.863 | 1.54 |
| 4 | 4.75 | 165.70/149.76 | 15.030/19.018 | 1.69 |

Practical Example 5

An amino resin film formed from 4 sheets of impregnated plastic nonwoven was produced similarly to practical example 2.

Practical Examples 6 to 10

The resin films obtained in practical example 5 were examined in terms of their flexibility. Here, reference laminates formed from 100% HPL, 100% material according to the invention and various mixed structures were tested. The test was performed in accordance with EN 310 using a universal test machine—Zwick Roell Z010. The dimensions of the test specimen were 150 mm×50 mm×0.8 mm with a bearing distance of 50 mm. The values obtained are presented in Table 3.

TABLE 3

| practical example | 6 | 7 | 8 | 9 | 10 |
|---|---|---|---|---|---|
| proportion of HPL [%] | 0 | 23 | 46 | 73 | 100 |
| proportion of amino plastic-nonwoven resin film [%] | 100 | 77 | 54 | 27 | 0 |
| thickness [mm] | 0.74 | 0.72 | 0.68 | 0.68 | 0.69 |
| bending stress at failure (EN ISO 178) [N/mm$^2$] | no failure | 100.3 | 144.5 | 160 | 167.9 |

TABLE 3-continued

| practical example | 6 | 7 | 8 | 9 | 10 |
|---|---|---|---|---|---|
| bending stress after displacement of 6 mm (EN 310; bearing distance 50 mm) [N/mm²] | 46 | 62 | 125 | 146 | 144 |

The invention claimed is:

1. An amino resin film, obtained by at least partial curing of an aminoplastic-nonwoven impregnate having a residual moisture of at least 4.0% by weight, the aminoplastic-nonwoven impregnate comprising, in each case in relation to the total weight of the aminoplastic-nonwoven impregnate,
   (a) 5.0% by weight to 95.0% by weight of a partially cured amino resin, and
   (b) 5.0% by weight to 95.0% by weight of a nonwoven, wherein the nonwoven comprises polyester fibers and polyamide fibers,
   and wherein the amino resin film has a residual moisture of less than 4.0% by weight.

2. The amino resin film according to claim 1, wherein the amino resin film has a bending strength, measured in accordance with EN ISO 178 in a three-point flexure test, of at most 160 N/mm².

3. The amino resin film according to claim 2, wherein the amino resin film has a tensile strength, measured in accordance with EN ISO 178 in a three-point flexure test, of at least 150 N/mm².

4. The amino resin film according to claim 2, wherein the amino resin film has a tensile strength, measured in accordance with EN 13934-1, of at least 150 N/mm².

5. The amino resin film according to claim 1, wherein the amino resin film has a tensile strength, measured in accordance with EN 13934-1, of at least 150 N/mm².

6. A laminate comprising an amino resin film according to claim 1.

7. The laminate according to claim 6, comprising
   (a) a core layer,
   (b) the amino resin film, and
   (c) optionally a decorative layer.

8. The laminate according to claim 6, wherein the laminate is a continuous pressed laminate (CPL).

9. A composite body, comprising a substrate and a laminate according to claim 6.

10. A press mold comprising an amino resin film according to claim 1.

11. The amino resin film according to claim 1, wherein the nonwoven, in each case in relation to its total weight, comprises
   5.0% by weight to 95.0% by weight of polyester fibers, and
   5.0% by weight to 95.0% by weight of polyamide fibers.

12. The amino resin film according to claim 1, wherein both the polyester fibers and the polyamide fibers have a mean diameter less than 15 μm.

13. The amino resin film according to claim 1, wherein the nonwoven has a weight per unit area in the range from 25 g/m² to 250 g/m².

14. The amino resin film according to claim 1, wherein the nonwoven impregnate has a residual moisture of less than 10.0% by weight.

* * * * *